Patented Mar. 9, 1954

2,671,783

UNITED STATES PATENT OFFICE 2,671,783

METHINES AND PROCESS OF MAKING SAME

Robert Wizinger, Basel, Switzerland, assignor to Ciba Limited, Basel, Switzerland, a Swiss firm No Drawing. Application March 26, 1951, Serial No. 217,690

Claims priority, application Switzerland March 27, 1950

7 Claims. (Cl. 260—240)

This invention relates to the manufacture of methines and of photographic emulsions containing the same.

It is known that the addition products of halogenalkyls to azoles and pyridines with a methyl group in α- or γ-position can be condensed with aromatic aldehydes to form styryl cyanines. Hitherto dyestuffs have been obtained, for example starting from compounds of the pyridine, quinoline, oxazole, thiazole, selenazole and indoline series.

The present invention is based on the observation that new valuable substances of the methine series, which are only to a small extent dyestuffs in the true sense, can be obtained by a similar condensation reaction.

In the process of manufacture of the invention a pyrazolium salt, which is substituted in at least one of the positions 3 and 5 of the pyrazole nucleus by a methyl group, is condensed with one or more components capable of the formation of methine groups.

The pyrazoles serving as starting materials for the present process must fulfil the condition that they contain a methyl group either in 3-position or in 5-position or in both of the said positions of the pyrazole nucleus. Such pyrazoles are known or can be made in a manner analogous to the known compounds. They may be further substituted, for example they may possess as substituent attached to the nitrogen atom in 1-position, an aryl radical, for example a phenyl radical. As examples of such pyrazoles there may be mentioned 5-methyl-pyrazole, 1,5-dimethyl-pyrazole, 1-phenyl-5-methyl-pyrazole and 1-phenyl-3,5-dimethyl-pyrazole.

As pyrazolium salts which are derived from such pyrazoles there are suitably employed the corresponding iodomethylates, as for example 1,2,5-trimethyl-pyrazolium iodide, 1-phenyl-2,5-dimethyl-pyrazolium iodide, 1-phenyl-2,3,5-trimethyl-pyrazolium iodide, 1,2,3,5-tetramethyl-pyrazolium iodide, 1-phenyl-2-ethyl - 3,5 - dimethyl-pyrazolium iodide and 1,2-di-n-propyl-3-phenyl-5-methyl-pyrazolium iodide.

As components which are capable of forming methine groups there can be employed according to the present process the known components of this type, suitably aromatic aldehydes, the aromatic nucleus of which may contain several, for example 2 to 4 condensed rings or only a single benzene ring, for example aldehydes of the pyrene, naphthalene and especially of the benzene series. These aldehydes may contain the aldehyde group attached directly to the aromatic nucleus or to a carbon side chain, especially to one which continues the aromatic conjugation of the double bonds, as is the case with cinnamic aldehyde. The aromatic aldehydes may also contain substituents, especially such of auxochromic effect such as alkoxy groups (for example methoxy groups) or hydroxyl groups. Especially valuable results can be obtained with the application of such aromatic aldehydes as contain a tertiary amino group, especially a dialkylamino group (for example a dimethylamino group).

As examples of such aldehydes there may be mentioned in addition to cinnamic aldehyde also benzaldehyde, anisaldehyde, p-dimethylamino-benzaldehyde, pyrene-3-aldehyde and p-dimethylamino-cinnamic aldehyde.

In order to carry out the condensation reaction it has proved to be suitable in the present process to work in an alkali metal alcoholate solution of a low molecular alcohol at elevated temperature, for example at the boiling point of the alcohol concerned (especially methyl and ethyl alcohol). As a rule quite a small quantity of alkali metal is sufficient, for example an equivalent quantity or a certain excess, but frequently less than 1 per cent. of sodium calculated on the quantity of alcohol used as solvent.

In view of the strong basic character of the pyrazoles used as starting materials it was not to be expected that the condensation would succeed at all and it could also not be foreseen that the actual condensation method set forth above would produce the desired result, for the reason that other methods, for example the method of working using pyridine, which in other cases is very effective, in this case fail completely.

The condensation may be illustrated by the following formulae in which the pyrazolium salt is written in the so-called carbenium form, although it is not intended to give the impression that the compound exists entirely in this form. In the case of a double condensation two mols of the same or different aldehydes can be used simultaneously or consecutively, in the latter case asymmetrical methine compounds being capable of production.

Case 1.—(Only one reactive methyl group)

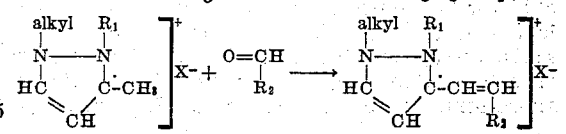

*Case 2.—(Two reactive methyl groups)*

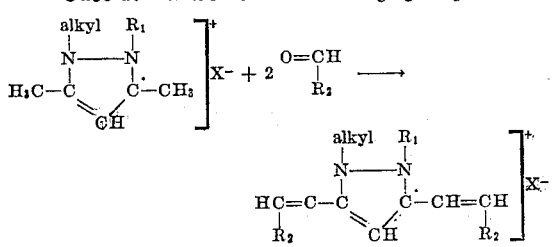

In the above formulae X⁻ indicates an anion, R₁ an alkyl or aryl radical and R₂—CHO the aldehyde used. In Case 2 if desired incomplete or asymmetrical condensations can be carried out.

Methines of the present invention have the general formula

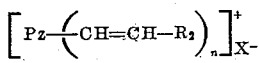

in which Pz indicates a pyrazolium radical, R₂—CH= the radical of an aldehyde of the formula R₂—CHO, X⁻ an anion and $n$ a whole number.

A more specific group of methines of the invention have the general formula

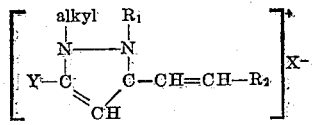

in which R₁ indicates an alkyl or aryl radical, R₂—CH= the radical of an aromatic aldeyhde, X⁻ an anion and Y hydrogen or the radical R₂—CH=CH—.

The methines obtainable according to the present process, especially the styryl and distyryl methines, possess an absorption maximum at relatively short wave-lengths, in contradistinction to corresponding methines from benzothiazoles and quinaldines. In the case of very many of the new compounds the absorption region lies wholly or to a preponderating extent in the ultraviolet, so that they are only very weakly colored, for example pale yellow or colorless.

In spite of this unusual position of the absorption region, the present compounds possess valuable properties for the sensitization of photographic emulsions, especially silver halide (for example silver bromide) emulsions, since they exert a sensitizing effect also in such regions where no noteworthy absorption takes place.

According to a further feature of the present invention therefore a process for the sensitization of a photographic emulsion comprises the incorporation of a methine of the present invention in the said emulsion. The sensitization can take place in the conventional manner, for example by immersing the prepared layers in a solution of the sensitizer; according to the thickness of the layer, immersion is required for from 2–10 minutes. Alternatively the sensitizers may be incorporated in the bulk emulsion to be used. The sensitized layers obtained can be used for the customary photographic purposes.

Of especial interest is the discovery that the compounds according to the invention are suitable for the sensitization of such photographic layers as are used for the detection of radioactive disruption phenomena and similar nuclear transformations and of the radiations arising therefrom. Thus for example the paths of rapidly moving electrons can be recorded, especially with relatively thick layers for example 0.12 to 0.4 mm. in thickness, produced from emulsions rich in silver bromide. Whereas the known sensitizers in general only allow of the recording of such electron paths as appertain to relatively slow electrons (up to about 10,000 electron volts), with the sensitizers according to the present invention the recording is rendered possible of the paths of much more rapid electrons (about 500,000 electron volts and above).

The following examples illustrate the invention:

*Example 1*

1 gram of 1,2,5-trimethylpyrazolium iodide is dissolved in 20 cc. of methanol. To the solution obtained is added a solution of 0.2 gram of sodium in 20 cc. of methanol and also 1 gram of benzaldehyde and the mixture is heated for 3 hours under reflux cooling to boiling. In this operation no noteworthy deepening of the color of the yellowish solution takes place. The whole is allowed to cool and the condensation product which has separated in the form of small white crystals is filtered off and washed with a little methanol. After recrystallization from methanol the condensation product of the formula

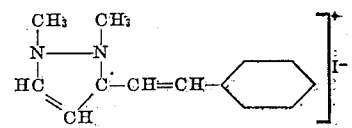

possesses the melting point 239° C.

If in the above example the benzaldehyde is replaced by 1.8 grams of anisaldehyde, then in the same manner a condensation product of melting point 212° C. is obtained.

By using instead of the benzaldehyde 2 grams of p-dimethylaminobenzaldehyde, there is obtained on boiling a solution the color of which is initially a greenish yellow, this subsequently deepening towards yellow-orange, and the condensation product obtained forms small yellow needles of melting point 253° C. By the use of 1 gram of p-dimethylaminocinnamic aldehyde an orange colored solution is obtained which deepens towards red-orange. The condensation product obtained is an orange-colored powder which after recrystallization from methanol forms small orange-brown plates of melting point 128° C.

The 1,2,5-trimethylpyrazolium iodide used in this example can be obtained in the following manner (also cf. H. A. D. Jowett & C. E. Potter, soc. vol. 83, page 467):

10 grams of 5-methylpyrazole are dissolved in a little methanol, 34.5 grams of methyl iodide added and the mixture heated in a closed tube to 110° C. during 4 to 5 hours. After cooling, a large part of the 1,2,5-trimethylpyrazolium iodide separates out in the form of prismatic needles. The product is collected and washed with a mixture of ether and alcohol. When the mother liquor is treated with ether, a further portion of the iodide is obtained. After several recrystallizations needles are obtained which melt at 256° C.

*Example 2*

1 gram of 1-phenyl-2,5-dimethylpyrazolium iodide is dissolved in 15 cc. of methanol. To this solution is added a solution of 0.2 gram of sodium in 20 cc. of methanol and 1.8 grams of very freshly distilled benzaldehyde and the whole is heated with reflux cooling for about 3 hours to boiling.

In this operation the originally almost colorless solution becomes red. On cooling the solution the color becomes lighter towards orange and the condensation product of the formula

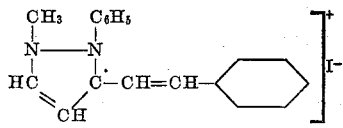

separates as an almost white microcrystalline precipitate. After purification of the condensation product by recrystallization from methanol, a white microcrystalline powder is obtained of melting point 194° C.

The 1-phenyl-1,2,5-dimethylpyrazolium iodide used in this example can be obtained from 1-phenyl-5-methylpyrazole (cf. L. Claisen & P. Roosen, Annalen der Chemie, vol. 278, page 279) by reaction with methyl iodide by the method set forth in the last paragraph of Example 1.

Example 3

To a solution of 1 gram of 1-phenyl-2,5-dimethylpyrazolium iodide (cf. Example 2) in 20 cc. of methanol is added a solution of 0.2 gram of sodium in 20 cc. of methanol and also 1.5 grams of anisaldehyde and the solution is heated to boiling for 3 hours with reflux cooling.

After cooling, the condensation product is separated by addition of ether in the form of lustrous ivory platelets. On recrystallization from methanol the compound is obtained in the form of small yellowish white needles of melting point 199° C.

Example 4

1 gram of 1-phenyl-2,5-dimethylpyrazolium iodide (cf. Example 2) and 2 grams of p-dimethylamino-benzaldehyde are consecutively dissolved in 20 cc. of methanol. A solution of 0.2 gram of sodium in 20 cc. of methanol is added and the solution is heated for 2 hours under reflux cooling to boiling. On cooling, a part of the condensation product formed separates in the form of small, fine, light yellow needles. By concentration of the mother liquor a further portion of the condensation product is obtained. The compound can be recrystallized from methanol and has the melting point 218° C.

By using instead of dimethylaminobenzaldehyde 1 gram of p-dimethylaminocinnamic aldehyde, in an analogous manner a condensation product is obtained which on concentration of the mother liquor first separates as a dark red-brown powder and on recrystallization from methanol gives small dark red-brown crystals of melting point 143° C. It corresponds to the formula

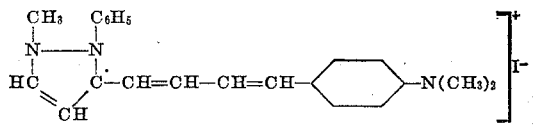

Example 5

1 gram of 1-phenyl-2,3,5-trimethylpyrazolium iodide is dissolved in 20 cc. of methanol. Thereupon 2 grams of freshly distilled benzaldehyde are added and also a solution of 0.2 gram of sodium in 20 cc. of methanol and the whole is heated to boiling with reflux cooling for about 2–3 hours. After cooling, the condensation product separates in small ivory-colored needles which after recrystallization from methanol have a melting point of 237° C. The product obtained corresponds to the formula

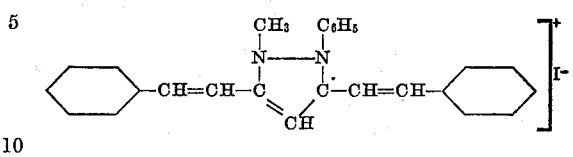

If in the above example the benzaldehyde is replaced by 1.5 grams of anisaldehyde a condensation product is obtained in the form of fine, light-yellow needles which after recrystallization from methanol have a melting point of 246° C.

The 1-phenyl-2,3,5-trimethylpyrazolium iodide used in this example can be produced as follows (also cf. Knorr, Berichte der Deutschen Chemischen Gesellschaft, vol. 20, page 1104):

Acetylacetone is heated on the water bath with excess of phenyl hydrazine. The reaction mixture is acidified with sulfuric acid. By steam distillation an oil is obtained which is immediately boiled for four hours under reflux with an excess of methyl iodide in methanol. The red colored reaction mass is decolorized by boiling with sulfur dioxide. After distilling off the methyl alcohol the remainder is treated with a dilute solution of sodium hydroxide and extracted by means of chloroform. After evaporation of the chloroform the 1-phenyl-2,3,5-trimethylpyrazolium iodide is obtained as an oil which on covering with ether immediately solidifies in crystalline form. By dissolving in alcohol and precipitating in ether a preparation is obtained of melting point 190° C.

Example 6

In a solution of 1 gram of 1-phenyl-2,3,5-trimethylpyrazolium iodide in 20 cc. of methanol are dissolved 2 grams of p-dimethylaminobenzaldehyde and thereupon a solution is added of 0.2 gram of sodium in 20 cc. of methanol. This mixture is now boiled for 9 hours with reflux cooling. The product is allowed to cool and after long standing a red-orange precipitate is deposited. After recrystallization from methanol the condensation product is obtained in the form of small lustrous orange-red needles of melting point 234° C.

By dissolving the crude product in methanol and introducing an aqueous sodium perchlorate solution, the perchlorate of the condensation product is obtained in the form of a red precipitate which, after recrystallization from methanol, likewise forms small lustrous orange-red needles which melt with decomposition from 258° C.

Example 7

1 gram of 1-phenyl-2,3,5-trimethylpyrazolium iodide and 1.5 grams of p-dimethylaminocinnamic aldehyde are dissolved consecutively in 20 cc. of methanol. A solution of 0.2 gram of sodium in 20 cc. of methanol is added and the whole is boiled for 2 hours under reflux. On cooling, the condensation product separates as a dark brown-red micro-crystalline powder and can be purified by recrystallization from methanol. It then has the melting point of 188° C.

In the following table are set out the colors of solutions in alcohol and the maxima of the absorption curves (λ max) of a few substances according to the present invention:

| | A (see formulae) | Color of Solution | λ$_{max}$ in mμ |
|---|---|---|---|
| Formula I | H | colorless | 305 |
| | CH$_3$O— | do | 329 |
| | (CH$_3$)$_2$N— | light yellow | 389 |
| Formula II | H | colorless | 311 |
| | CH$_3$O— | do | 338 |
| | (CH$_3$)$_2$N— | lemon yellow | 403 |
| Formula III | H | colorless | 316 |
| | CH$_3$O— | pale yellow | 345 |
| | (CH$_3$)$_2$N— | yellow orange | 423 |

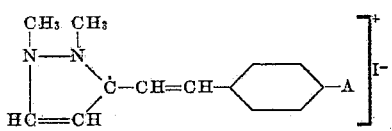

I

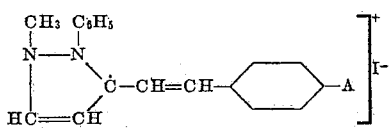

II

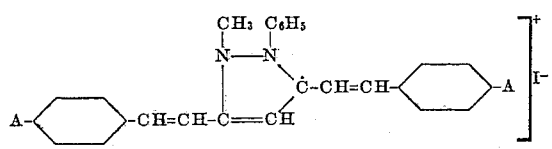

III

*Example 8*

3.7 grams of 1,2,3,5-tetramethylpyrazolium iodide (cf. Annalen der Chemie, vol. 279, page 238 (1894)) and 3 grams of dimethylaminobenzaldehyde are dissolved in 75 cc. of alcohol. Then 75 cc. of a sodium ethylate solution are added which solution is produced by introducing 2 grams of sodium into 100 cc. of alcohol. The whole is boiled for 6 hours on the water bath with reflux cooling. After cooling the condensation product has for the most part separated. By addition of ether the precipitation can be completed. After recrystalization from alcohol or pyridine the dyestuff forms small orange-red crystals. The color of its solution in alcohol is yellow and the maximum of the absorption curve is from 393–395 mμ.

The dyestuff possesses the constitution:

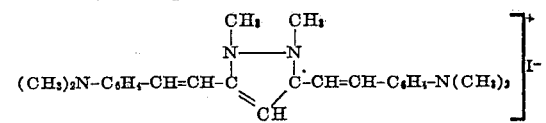

With 3.5 grams of dimethylaminocinnamic aldehyde (instead of 3 grams of dimethylaminobenzaldehyde) with similar working conditions, the dyestuff of the following formula is obtained:

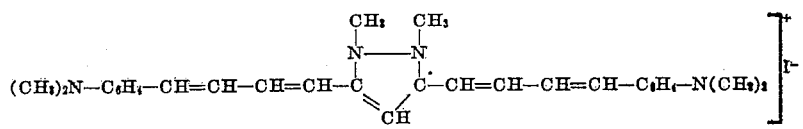

It forms small red crystals which dissolve in alcohol to give an orange yellow solution and the maximum of the absorption curve is at 418 mμ.

*Example 9*

To a mixture of 75 cc. of ethyl alcohol and 75 cc. of a sodium-ethylate solution which contains in 100 cc. 2 grams of sodium, are added 3.7 grams of 1,2,3,5-tetramethylpyrazolium iodide (cf. Annalen der Chemie, vol. 279, page 238 (1894)) (1/100 mol) and 1.5 grams of dimethylaminobenzaldehyde (1/100 mol) and the whole is boiled for 6 hours under reflux cooling. Then 1.75 grams (1/100 mol) of dimethylaminocinnamic aldehyde are added and boiling continued for a further 6 hours. On cooling, the asymmetrical condensation product separates as a red powder. The color of its solution in alcohol is yellow orange; its absorption maximum is at 416 mμ.

The following constitution can be ascribed to the dyestuff:

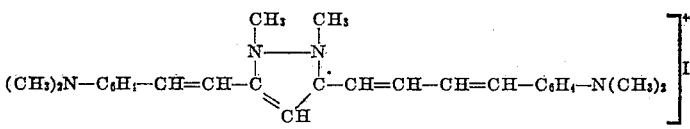

If the condensation is carried out under the same conditions, first with 1/100 mol (2.3 grams) of pyrene-3-aldehyde and then with 1/100 mol (1.5 grams) of dimethylaminobenzaldehyde, a dyestuff is produced of the formula

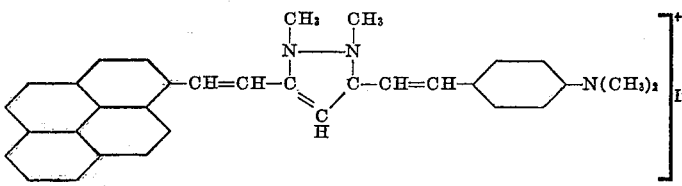

It dissolves in alcohol with a yellow color; the absorption maximum is at 386 mμ.

*Example 10*

3.7 grams of 1,2 - di - n - propyl - 3 - phenyl-5-methyl-pyrazolium iodide are heated to boiling on the water bath for 2 hours, in 100 cc. of sodium ethylate solution containing 1 gram of sodium, with 2 grams of dimethylaminobenzaldehyde. On leaving to cool overnight the dyestuff separates as an orange-yellow powder. The color of its solution is yellow; its absorption maximum is at 410 mμ.

It possesses the constitution

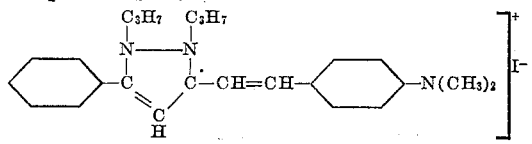

A dyestuff of the constitution

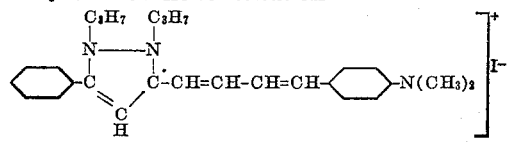

is obtained in an analogous manner by the application of 2.5 grams of dimethylaminocinnamic aldehyde. The color of the solution of this compound is yellow; its absorption maximum is at 420 mμ.

The 1,2 - di - n - propyl - 3 - phenyl-5-methylpyrazolium iodide is produced by 6 hours heating of 10 grams of 3-phenyl-5-methylpyrazole (from benzoylacetone and hydrazine according to Annalen der Chemie, vol. 279, page 248 (1894)) with 20 grams of n-propyl iodide in a sealed tube to 120–130° C. The crude product is taken up in chloroform and the solution decolorized with a little sulfite solution, dried with anhydrous sodium sulfate and then the pyrazolium salt precipitated with ether.

Example 11

Into a sodium ethylate solution from 150 cc. of alcohol and 2 grams of sodium, are introduced 3.28 grams (1/100 mol) of 1-phenyl-2-ethyl-3,5-dimethylpyrazolium iodide and also 3 grams of dimethylaminobenzaldehyde and the whole is heated to boiling for 2–3 hours. After cooling the separated dyestuff is filtered off and purified in the usual manner. The color of its solution in alcohol is yellow and the maximum of the absorption curve is at 413 mμ.

The dyestuff corresponds to the formula

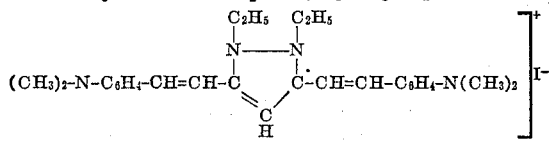

In an analogous manner with the equivalent quantity of dimethylaminocinnamic aldehyde (3.5 grams) the dyestuff of the formula

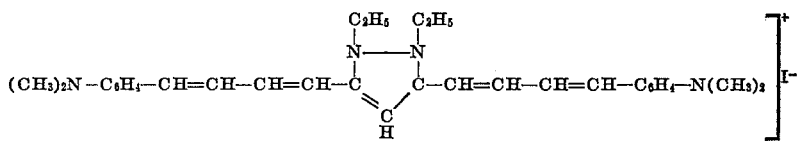

can be produced. Color of solution orange yellow; absorption maximum 432 mμ.

The 1-phenyl-2-ethyl-3,5-dimethylpyrazolium iodide serving as starting material is obtained by heating of 1-phenyl-3,5-dimethylpyrazole with ethyl iodide to 120° C. in a sealed tube.

Example 12

The following three solutions are produced:

Solution 1.—60 cc. of distilled water, 3.6 grams of gelatine "Winterthur No. 3203" and 1 cc. of an 0.2 per cent. solution of 6-nitrobenzimidazole.

Solution 2.—23 cc. of distilled water, 14.8 grams of potassium bromide, 0.6 gram of potassium iodide and 7 cc. of a 10 per cent. solution of cadmium bromide ($CdBr_2.4H_2O$).

Solution 3.—30 cc. of distilled water and 20 grams of silver nitrate.

When the gelatine has swelled sufficiently solution 1 is heated to 37° C. and maintained at this temperature. With dark room illumination and good stirring, within 30 minutes solutions 2 and 3 are simultaneously added drop by drop to solution 1 in such a manner that there is always a small excess of potassium bromide of the order of about 3 drops. When the introduction is complete there are added all at once 6 cc. of a concentrated ammonia solution of a density of 0.91 and 5 minutes later neutralization is effected by addition of 4.5 grams of citric acid. Thereupon an additional 1 gram of the gelatine used for solution 1 is added and 13 minutes later the emulsion is poured into ice cooled porcelain dishes and left for 7 hours in a refrigerator. Thereupon the emulsion is divided into pieces and washed for about 15 hours with very cold water until no more ammonium ions can be detected with Nessler reagent. Thereupon the divided pieces of emulsion are melted in a beaker heated to 28°. Into the melt obtained are first introduced 2 cc. of a 2 per cent. chrome alum solution, then a mixture of 2 cc. of glycerine and 4 cc. of distilled water and finally a further 5 cc. of a 0.04 per cent. solution of the condensation product according to Example 6 in alcohol. All these additions must take place with good mechanical stirring. The emulsion is then ready for pouring.

Instead of adding the sensitizer to the emulsion before pouring, the emulsion-coated plate can be immersed for 2–10 minutes in a solution which is produced from 2 cc. of a saturated alcoholic solution of the product and 98 cc. of alcohol.

Since the link between the iodine ion shown in the formulae of the preceding Examples and the dyestuff molecule properly speaking is purely ionogenic it may obviously be replaced by any desired other anion, e. g. by double decomposition with a suitable salt, especially one that yields an insoluble salt with iodine ions, e. g. a silver salt, such as silver nitrate, sulfate, acetate, etc.

In the appended claims, the term "alkyl" is intended to mean lower alkyl, for example up to about 6 carbon atoms.

What is claimed is:

1. A methine of the general formula

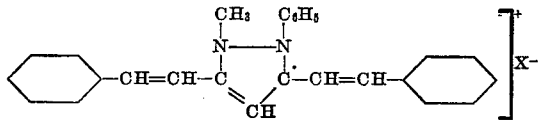

wherein $X^-$ stands for an anion

2. A methine of the general formula

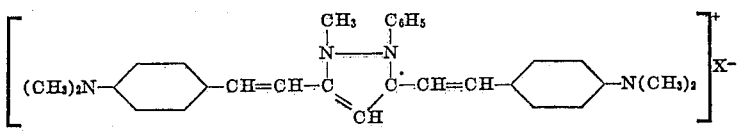

wherein X⁻ stands for an anion.

3. A methine of the general formula

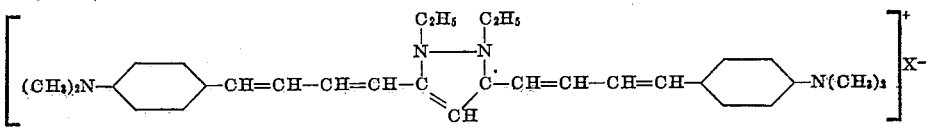

wherein X⁻ stands for an anion.

4. A methine of the general formula

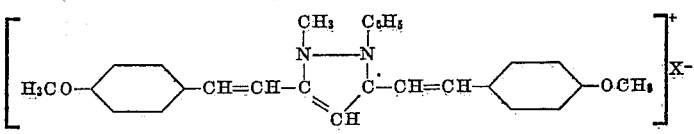

wherein X⁻ stands for an anion.

5. A methine which corresponds to the formula

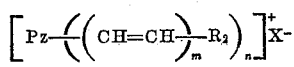

wherein Pz stands for a pyrazolium radical, $R_2$ stands for a member selected from the group consisting of phenyl, lower alkoxyphenyl and lower dialkylaminophenyl, X⁻ stands for an anion, and $m$ and $n$ each stands for a whole number smaller than 3, each

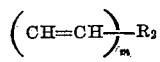

radical being attached to Pz in one of the positions 3 and 5 thereof.

6. A methine which corresponds to the formula

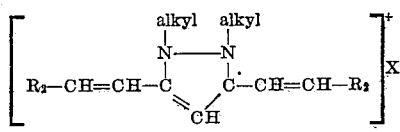

wherein X⁻ stands for an anion and each $R_2$ stands for a member selected from the group consisting of the radicals

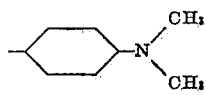

and

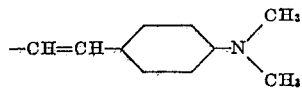

7. A process for the manufacture of a methine which comprises reacting a pyrazolium salt, which is substituted in at least one of the positions 3 and 5 by a methyl group, with at least one aldehyde of the formula

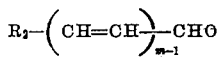

wherein $m$ is a whole number smaller than 3 and $R_2$ stands for a member selected from the group consisting of phenyl, lower alkoxyphenyl and lower dialkylaminophenyl, in an alkali metal alcoholate solution of a low molecular alcohol.

ROBERT WIZINGER.

References Cited in the file of this patent

UNITED STATES PATENTS

| Number | Name | Date |
|---|---|---|
| 2,032,502 | Rodd | Mar. 3, 1936 |
| 2,179,895 | Muller | Nov. 14, 1939 |
| 2,265,907 | Kendall | Dec. 9, 1941 |

FOREIGN PATENTS

| Number | Country | Date |
|---|---|---|
| 425,609 | Great Britain | 1935 |